3,753,856
CORE CLAMPING SYSTEM FOR A
NUCLEAR REACTOR
Edward B. Ash, Canoga Park, Calif., assignor to
Rockwell International Corporation
Filed June 1, 1970, Ser. No. 42,362
Int. Cl. G21c 13/04
U.S. Cl. 176—87          3 Claims

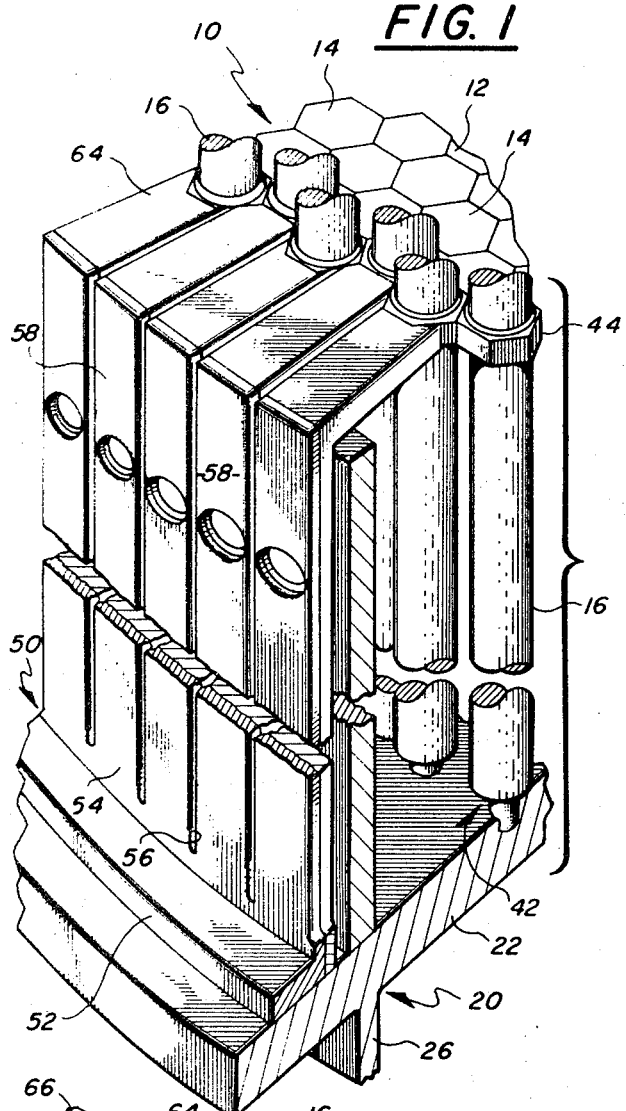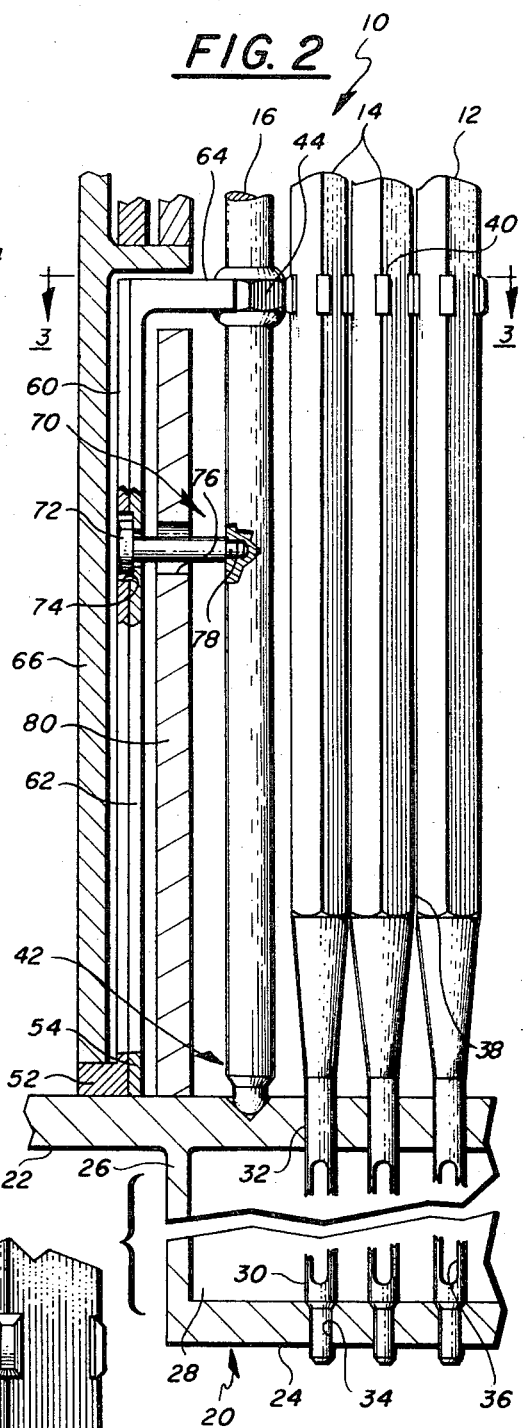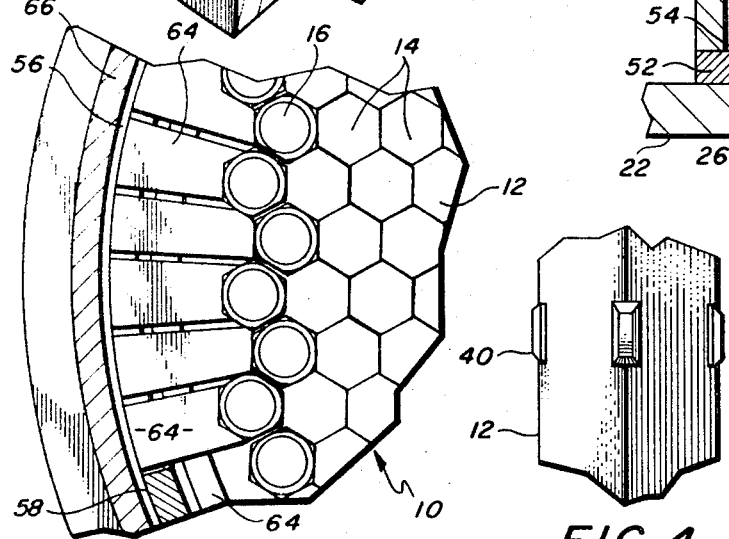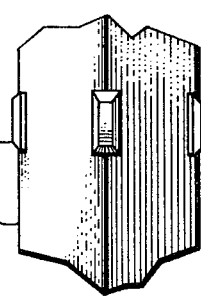
FIG. 1
FIG. 2
FIG. 3
FIG. 4
INVENTOR.
EDWARD B. ASH
BY Robert M. Davidson
ATTORNEY United States Patent Office 3,753,856
Patented Aug. 21, 1973

ABSTRACT OF THE DISCLOSURE

A core clamping system for use with nuclear reactors wherein bimetallic elements are placed around a core so that at high temperature and flux conditions they act to exert an inwardly directed clamping force on a predetermined clamping plane thereby counteracting the tendency for the core to expand under those conditions and maintaining constant core geometry.

BACKGROUND OF THE INVENTION

(A) Field of the invention

This invention relates to the field of nuclear reactors, and more particularly to methods and means for maintaining structural integrity within the core region of nuclear reactors. Still further, this invention relates to methods and means for clamping the cores of nuclear reactors.

In the operation of nuclear reactors a temperature gradient is built up within the core region and across the fuel elements with the highest temperature at the center of the core. Fuel elements placed within such a gradient tend to bow convexly toward the center of the core because of the side of the fuel element toward the center expands more than the side away from the center. This action has detrimental effects on the core geometry and upon the ability to maintain a reproducible configuration. If the core is not properly clamped, it can have detrimental effects on reactivity.

Another factor which must be considered in design of nuclear reactor cores, especially in cores designed for operation under elevated neutron fluxes such as fast breeder reactors is the swelling of structural material subjected to fast neutron irradiation. Experiments have shown that structural material such as austenitic stainless steel develops internal voids under fast neutron irradiation which are responsible for the swelling observed. This swelling can cause fuel elements to bow, because of the larger amount of swelling towards the center of the core. This bowing can have detrimental effects on reactivity. Therefore, the core must be clamped properly so as to prevent the fuel elements from vibrating and to maintain proper alignment under all conditions. Any clamping force must be easily removed so that elements may be removed for fuel handling.

Since the maintenance of proper alignment geometry within the core of nuclear reactors is vital, there is a great need for methods and means for achieving integrity at all operating conditions.

(B) Description of the prior art

Various core-clamping systems have been proposed whereby an external force is exerted on the core of the reactor to assure constant geometry. Many of these proposals involve the use of core expansion energy to create a clamping force or the use of complex mechanical systems. While core expansion energy is an efficient source of clamping force control, it is most difficult to completely remove the clamping force in many of these prior art devices to allow for refueling or other shutdowns. The use of complex mechanical systems involves unacceptable expense and presents reliability and maintainability problems.

Thus there remains in the art a need for improved means directed to maintaining the structural integrity of nuclear reactor cores by means of applying a clamping force which can be readily removed for refueling.

SUMMARY OF THE INVENTION

I have discovered a novel means for maintaining the geometry integrity of nuclear reactor cores using bimetallic elements which under the operating conditions of the core exert an inwardly directed clamping force thereby maintaining core geometry.

Accordingly, the objects of the present invention are:

to provide an improved form of core restraint for nuclear reactors, to provide an improved core clamping means for nuclear reactors, to provide an improved core clamping means for fast nuclear reactors, and to provide a means by which the core clamping forces can be removed for refueling by merely lowering the reactor inlet temperature.

These and other objects, advantages and features of the invention will become more apparent upon consideration of the following description of the preferred embodiments wherein reference is made to the attached drawings.

BRIEF DESCRIPTION OF THE DRAWINGS

FIG. 1 is a perspective view, partly sectional and partly broken away, of a nuclear reactor core including the described reactor core restraint of the present invention.

FIG. 2 is an elevation, partly sectional and partly broken away, of the nuclear reactor core and reactor core restraining of FIG. 1.

FIG. 3 is a sectional plan view, partly broken away, of the nuclear reactor core and reactor core restraint of FIGS. 1 and 2, particularly along line 3—3 of FIG. 2.

FIG. 4 is an enlarged perspective view, partly broken away, of an element of the reactor core of FIG. 1.

DESCRIPTION OF THE PREFERRED EMBODIMENTS

The clamping system of this invention is particularly adapted for use with fast neutron reactors, as for example fast breeder reactors. When used therewith the clamping system will generally be located between the reflector elements and the neutron shield. In this connection, reference is made to FIG. 1 wherein a nuclear reactor core 10 includes a plurality of similar fuel elements 12 that contain a suitable nuclear fuel. The fuel elements 12 are arranged to define the central region of the nuclear reactor and are surrounded by a plurality of similar blanket elements 14 that are arranged about the periphery of the bundled fuel elements. A row of reflector elements 16 abuts the outer row of elements. The blanket elements 14 can be identical in external configuration to the fuel elements 12. The reflector elements 16 can be stainless steel bars of similar external configuration.

The reactor core 10 is normally the primary heat source for a nuclear power plant. Where the nuclear reactor core operates in a fast neutron flux, the neutron fuel in the several fuel elements 12 can be mixed plutonium and uranium oxide suitably contained and subdivided to permit adequate heat removal by a circulating coolant such as liquid sodium. The blanket elements 14 can contain uranium oxide to improve neutron utilization.

The entire array of elements—fuel elements 12, blanket elements 14, reflector elements 16 which form the nuclear reactor core 10—is supported on a core support structure 20.

The core support structure 20 has an upper grid plate 22 and a lower grid plate 24. The core support structure is connected to a reactor vessel (not shown) that encloses the nuclear reactor core 10; the core support structure thus provides a substantially fixed support for the entire array of elements. Upper grid plate 22 is spaced from the lower grid plate 24 by cylindrical shell portion 26 which can be integrally formed with the upper grid plate 22 and lower grid plate 24 as illustrated. The spaced upper and lower grid plates 22 and 24 develop a plenum chamber 28 for supplying high pressure coolant to the core.

Each of the fuel elements 12 and blanket elements 14 has a tubular end portion 30 that is positioned through a pair of aligned apertures in the upper and lower grid plates 22 and 24, such as aligned apertures 32 and 34 respectively. The coolant flow in the plenum chamber 28 flows into each fuel element 12 and blanket elements 14 through similar orifices 36 in the tubular end portion 30 of each element. The aligned apertures such as apertures 32 and 34, in the upper and lower grid plates 22 and 24 are suitably spaced apart from similar pairs of aligned apertures so that a gap, such as gap 38, extends between adjacent elements. Gap 38 provides for ease of assembly of the elements into the desired core array and for the removal of elements therefrom, and to accommodate for any manufacturing tolerances in the dimensions of the elements. Hard-faced, spacer pads 40 at each corner (see detail in FIG. 4) of the element housing. i.e., fuel elements 12 and blanket elements 14, provide inter-element bearing points and assure that gap 38 has a minimum dimension for core assembly clearance.

The reflector elements 16 are gimbel-mounted on the upper grid plate 22 by a quasi ball-and-socket support 42 that does not penetrate into the plenum chamber 28. A flange 44 on each reflector element is adapted to bear upon the adjacent spacers pads 40 of the blanket elements 14 in a "clamping plane" as defined by the abutting flange and spacer pads.

The preferred core clamp 50 of the present invention cooperates with the components of the reactor core 10 as described hereinbefore. In FIG. 1, a generally cylindrical core clamp 50 is connected to the core support structure, and particularly to the outwardly extending upper grid plate 22 as shown in FIG. 2. A flange portion 52 of the core clamp 50 is connected by welding, bolts, or the like to the upper grid plate 22. A barrel portion 54 of core clamp 50 is suitably formed with a plurality of peripherally spaced slots 56 developing spaced-apart resilient segments 58. Each of the resilient segments 58 consists of a bimetallic strip having outer section 60 and inner section 62. As shown in FIG. 2 the inner section 62 includes a pressure shoe portion 64 that bears against its respective reflector element flange 44. Each pressure shoe portion can be suitably formed to the peripheral contour of its respective reflector element flange as illustrated. The segmented barrel portion 54 thereby has a plurality of bimetallic segments acting upon the elements in the reactor core and developing an inward clamping force at the clamping plane.

Segments 58 can be formed from a variety of combinations of metals. For example, portion 62 of the clamp can be formed from a 300 series stainless steel, and portion 60 of ferritic steel (2¼ Cr-1Mo) or tungsten. Other bimetal combinations will be apparent to those skilled in the art. The requirements are that the metals be of sufficient strength to withstand the stresses involved, that the difference in thermal expansion between the metal of strip 60 and strip 62 be sufficient to develop a large enough clamping motion and force, the materials be compatible with the surrounding environment, and the materials be capable of being bonded or otherwise attached together.

The elevation of the clamping plane as generally defined by the pressure shoe portions 64 of each core clamp segment 58, the flange 44 of each reflector element 16, and the spacer pads 40 of each fuel element and blanket elements 12 and 14 relative to the core support structure 20, is selected to assure negative reactivity changes in the reactor core which can result from thermal bowing. This clamping plane is normally located above a central plane in the active reactor core to insure the desired negative contribution to the power coefficient.

A thermal shield consisting of at least inner shield member 80 is spaced from an outer shield member 66. Both are preferably positioned at least around the active portion of the reactor core 10 with core clamp 50 positioned generally therebetween. This shielding protects the reactor vessel (not shown) and core clamp 50 from neutron damage, and further reduces internal heat generation in the external biological shielding (not shown but conventional).

Since reflector elements 16 are gimbal-mounted, a suitable link member 70 can be used to retain reflector elements 16 when the fuel and blanket elements 12 and 14 are individually or severally removed from reactor core 10. For example, a link member 70 as illustrated by FIG. 2 has a suitable shoulder cap screw 72 positioned through a clear hole 74 in clamp segment 58 and threaded into a tapped hole 78 in the reflector element 16.

Thus there has been described a simple and efficient core clamping system that takes advantage of the differences in thermal expansion of members of a bimetallic strip thereby creating a suitable clamping motion and force under all operating conditions of a nuclear reactor core. The clamping force may be easily removed by merely lowering system temperature. This invention has been described with reference to preferred embodiments and preferred modifications. However, it will be apparent to those skilled in the art that other modifications and adaptations of the clamping device are possible without departing from the spirit and scope of the invention as defined by the claims below. For example, segments 58 may be larger thereby acting upon more than one or two reflector elements. Also, the clamping force exerted by the bimetallic strips can be magnified through the use of mechanical advantage mechanisms such as levers or cams. Furthermore, the bimetallic element need not be a straight section but could consist of a U-shaped or inverted U-shaped member which exerts a clamping force due to the tendency of the bent bimetallic member to straighten out at elevated temperatures.

I claim:

1. A core clamping system in combination with a nuclear reactor core comprising:
   (a) a core support member positioned immediately below said nuclear reactor core,
   (b) a plurality of elongated elements in the reactor core supported by said core support member, each of said elongated elements being positioned generally parallel with the reactor core longitudinal axis,
   (c) a cylindrical core clamp having a circumferential base portion extending essentially from a position adjacent to and fixed with respect to said core support member and a circumferential series of parallel, spaced, resilient segments integral with and extending upwardly as cantilevered beams from said base portion to a horizontal clamping plane located above a central horizontal plane of said reactor core, each of said segments being separated by axially extending slots, a pressure shoe portion extending from the upper end of each of said segments, said portion acting upon peripheral ones of said elongated elements, the upwardly extending parallel segments consisting of longitudinal bimetallic strip means, said bimetallic strip means comprised of strips of metals having different rates of thermal expansion and being radially adjacent to and facing said core such that at operational core temperatures said bimetallic strip means exerts an inwardly directed clamping force on said core through said pressure shoe portions.

2. The clamping system of claim 1 wherein said bimetallic strip means is substantially straight at normal preoperational temperatures.

3. The clamping system of claim 1 wherein a shielding material is positioned between said core and said bimetallic strip.

References Cited

UNITED STATES PATENTS

| 3,215,608 | 11/1965 | Guenther | 176—85 X |
| 3,260,650 | 7/1966 | Kalk et al. | 176—85 X |
| 3,011,962 | 12/1961 | Kock et al. | 176—17 X |

FOREIGN PATENTS

| 221,126 | 5/1957 | Australia | 176—85 |
| 977,019 | 12/1964 | Great Britain | 176—85 |

CARL D. QUARFORTH, Primary Examiner

H. E. BEHREND, Assistant Examiner

U.S. Cl. X.R.

176—85